Nov. 17, 1936.  E. C. HEDLER  2,060,864
CABLE FITTING FOR FIELD USE AND METHOD AND MEANS FOR MAKING SAME
Filed Sept. 26, 1933  2 Sheets-Sheet 1
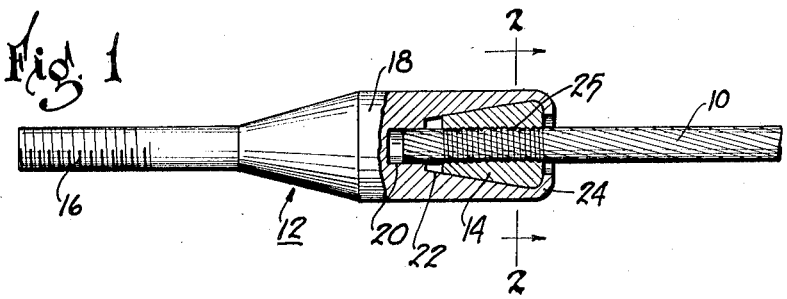
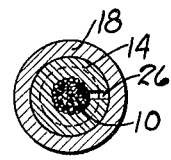
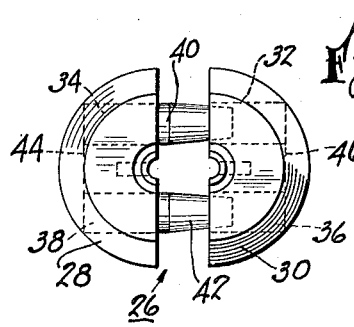
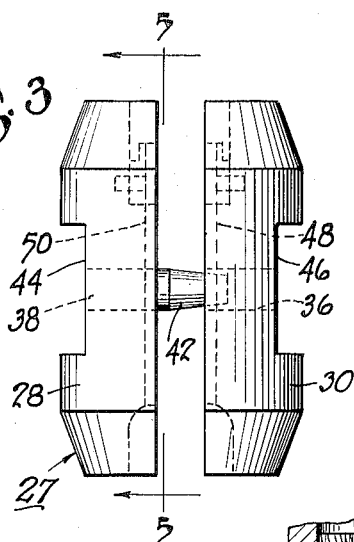
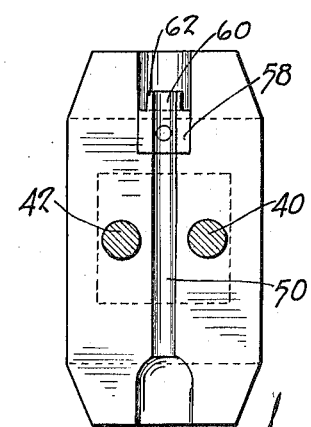
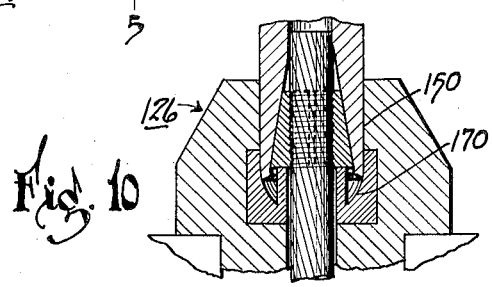
INVENTOR.
Edwin C. Hedler
BY Jerome R. Cox
ATTORNEY.

Nov. 17, 1936. E. C. HEDLER 2,060,864
CABLE FITTING FOR FIELD USE AND METHOD AND MEANS FOR MAKING SAME
Filed Sept. 26, 1933 2 Sheets-Sheet 2
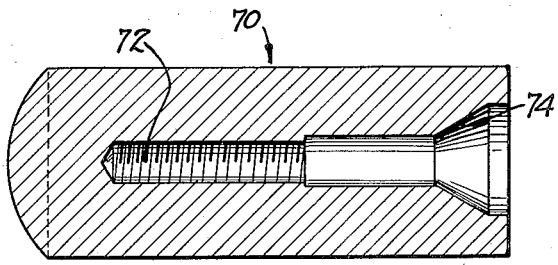
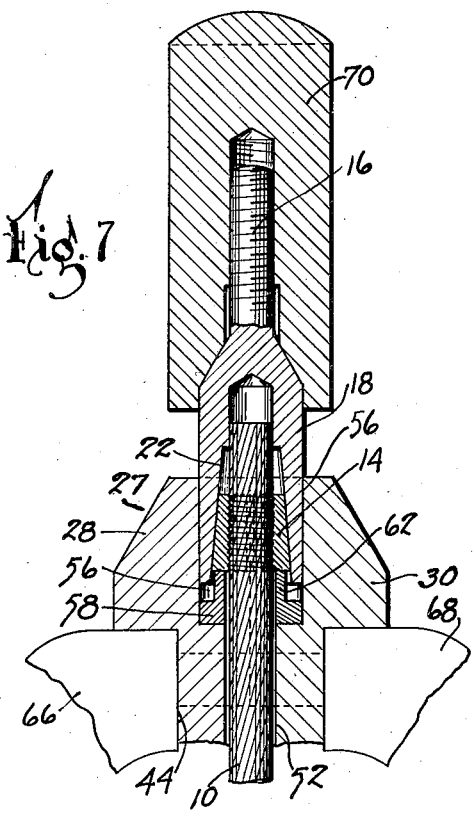
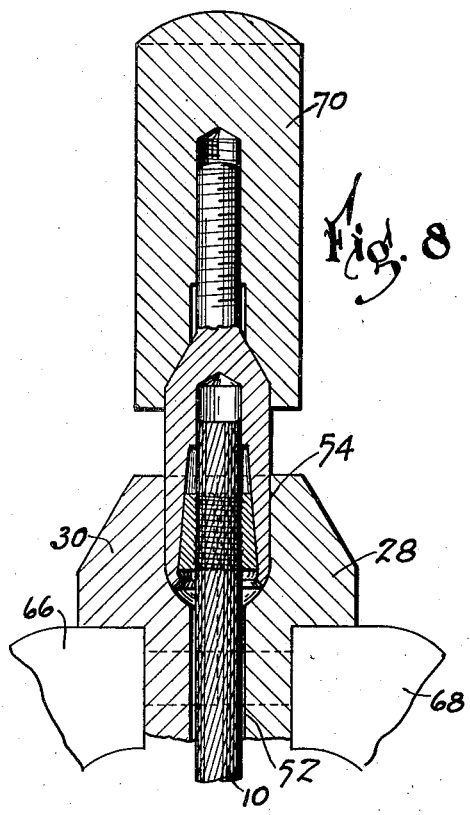
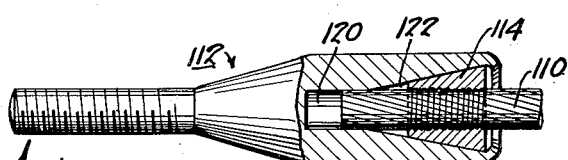
INVENTOR.
Edwin C. Hedler
BY Jerome R. Cox
ATTORNEY.

Patented Nov. 17, 1936

2,060,864

UNITED STATES PATENT OFFICE 2,060,864

CABLE FITTING FOR FIELD USE AND METHOD AND MEANS FOR MAKING SAME

Edwin C. Hedler, South Bend, Ind., assignor to Bendix Aviation Corporation, South Bend, Ind., a corporation of Delaware Application September 26, 1933, Serial No. 691,091

10 Claims. (Cl. 153—1)

This invention relates to cables and fittings therefor and to improved methods of and means for securing end fittings to cables.

One of the objects of the invention is to provide a method of securing end fittings to cables which can be conveniently used either in the shop or in the field.

A further object is to provide a joint for cable end fittings which will remain effective under very high loads.

A feature of the invention is a two piece double ended die for securing the fitting to the cable.

A further feature is the utilization of a tapered insert interposed between the cable and the fitting for securing the cable and the fitting together.

Further features and objects of the invention should be apparent after a reading of the subjoined specification and claims and after consideration of the accompanying drawings, in which:

Figure 1 is a view partly in elevation and partly in section showing an end fitting attached to a cable in accordance with my invention;

Figure 2 is a view in section taken substantially on the line 2—2 of Figure 1;

Figure 3 is a view in side elevation of the two parts of a die which I use in securing fittings to cables;

Figure 4 is a plan view of Figure 3;

Figure 5 is a view partly in section taken on the line 5—5 of Figure 3;

Figure 6 is a view in section of a hammer I use in combination with the die;

Figure 7 is a view in section illustrating an early step in my improved process;

Figure 8 is a view similar to that of Figure 7 illustrating a later step of my improved process;

Figure 9 is a view similar to that of Figure 1 showing a slightly different form of attachment for a cable fitting; and Figure 10 is a fragmentary view similar to a portion of Figure 7 showing a modified form of die and illustrating a slightly different process.

Referring particularly to the drawings, I have shown in Figure 1 a tension element comprising a stranded wire cable 10 inserted in the end of an end fitting 12 and secured there by a tapered sleeve 14.

The fitting 12 is provided with an outer threaded end 16, and an enlarged inner end 18. The latter is bored with a cylindrical bore 20 for positioning the end of the cable, and with a tapered bore 22 for coacting with the taper of the sleeve 14 to tighten the sleeve about the cable. The extreme inner end 24 of the fitting is swaged over to hold the sleeve.

The sleeve 14 is split (as at 26) by a radial slot through one wall. It is formed with a uniform external taper and has the larger end slightly rounded so as to aid in correctly swaging the end 24 of the fitting. As shown and as preferred the sleeve is of case hardened steel though it might also be formed of metal softer than the cable as is described in connection with Figure 9. The sleeve is formed with shallow threads or grooves 25 which bite into and secure the cable to the sleeve. The threads are formed by drilling with a larger tap drill than that required for the thread size to be used and thereafter forming the threads.

Figures 3, 4, 5, and 6 illustrate the die and hammer which I use in forming the joint described. The die 27 comprises two halves 28 and 30 formed with aligned holes 32 and 34 and 36 and 38 through which dowels 40 and 42 are inserted. The halves are each formed with flat faces as 44 and 46 by means of which they may be clamped in a vise.

The halves are each formed with semi-cylindrical grooves 48 and 50 which fit together to form openings 52, 54, and 56 in the complete die. Within the opening 56 there is seated a tool steel insert 58 formed with a bore 60 aligned with the opening 52. The insert 58 is provided with a projection 62 which is effective (as is shown most clearly in Figure 7) to force the sleeve 14 into the tapered bore 22 and is thus effective to narrow the slot 26 and thus clamp the sleeve 14 to the cable 10, the relatively soft cable being deformed to enter into the grooves of the threads 25.

A swaging drift 70 formed with a tapped bore 72 is adapted to fit over the fitting 12, the tapped bore 72 being threaded on the end 16 and a tapered shoulder 74 bearing against the conical exterior surface of the head 18.

In securing an end fitting to a cable, I assemble the two halves of the die 27 in a vise. For instance, as shown, the jaws 66 and 68 of a vise bear against the flat faces 44 and 46 and together with the dowel pins 40 and 42 hold the die securely in position. The cable is inserted through the opening 52 and the collar 14 is slipped on the end of the cable. Inasmuch as the slot 26 is still spread, the collar fits loosely on the cable. The fitting is secured in the drift 70 and is slipped onto the cable and collar. Blows upon the drift force the collar 14 into contact with the projections 62, thus forcing the collar up into the tapered bore of the fitting and compressing the collar. This compression forces the metal of the cable into the grooves of the collar and firmly locks the cable to the collar. The vise is now loosened, the halves of the die are separated and turned over as in Figure 8, and the vise again tightened. Further blows on the drift turn in the ends 24 to clamp the collar in the end of the fitting.

The fitting 112 shown in Figure 9 has the tapered bore 122 merged into the cylindrical bore 120 so that it is easier to fit the end of the cable 110 therein. The sleeve 114 is formed of a soft metal softer than the cable and instead of deforming the cable is itself deformed to lock with the grooves in the stranded wire cable 110. If desired, however, the sleeve 114 could be formed of harder metal as disclosed in connection with Figure 1.

The die 126 shown in Figure 10 has the hole 150 formed with a rounded bottom as at 170 so that the swaging of the ends of the fitting may start before the die is turned over.

It is to be understood that the above described embodiments of my invention are for the purpose of illustration only and various changes may be made therein without departing from the spirit and scope of the invention.

I claim:

1. The process of securing a fitting to an end of a tension element which comprises placing a tapered sleeve on the tension element, inserting the tension element and sleeve in a tapered bore in the fitting and driving the sleeve into the bore to deform the metal of the sleeve into grooves in the tension element and to deform the end of the fitting to lock the sleeve within the tapered bore.

2. The process of securing a fitting to an end of a tension element which comprises placing a tapered sleeve on the tension element, inserting the tension element and sleeve in a tapered bore in the fitting and driving the sleeve into the bore to deform the metal of the element into grooves in the sleeve and to contract the outer end of the fitting to lock the sleeve within the tapered bore.

3. The process of securing a fitting to an end of a tension element which comprises placing a sleeve on the tension element, inserting the tension element and sleeve in a bore in the fitting, driving the sleeve into the bore to secure the sleeve to the fitting, and turning in the end of the fitting to secure the sleeve therein.

4. A die for fastening an end fitting to a cable by means of a sleeve having a central opening extending longitudinally through the die through which the cable may extend, and enlarged openings at each end, one end of which is provided with a tool steel insert having projections for driving the sleeve into the fitting and the other end of which is formed with a curved bottom for turning the ends of the fitting for locking the sleeve therein.

5. For use in securing a cable to an end fitting by means of a sleeve, a two part die through which the cable may pass and having openings for receiving the sleeve and fitting, means for holding the parts of the die together, and a drift having a bore conforming to the exterior of the fitting for driving the fitting over the sleeve.

6. An article of the class described comprising a stranded wire cable, an end fitting therefor having means on its outer end for securing it to another member and having a tapered bore at its inner end, a split internally threaded tapered sleeve of case hardened metal surrounding the cable and driven into the tapered bore to deform the cable by the threads of the sleeve to lock the cable to the sleeve, and means including an inturned end of the inner portion of the fitting to engage the sleeve and lock the sleeve to the fitting.

7. The method of fixing a flexible cable to a fitting which comprises forming a tapered bore in one end of the fitting, placing a tapered split sleeve having internal gripping teeth over the end of the cable, inserting the sleeve and cable into the tapered bore and turning the end of the fitting over the sleeve to urge the sleeve into locking engagement with the cable.

8. The method of fixing a flexible cable to a fitting which comprises forming a tapered bore in one end of the fitting, placing a tapered split sleeve having internal gripping teeth in the tapered bore, projecting the end of the cable through the sleeve and turning the end of the fitting over the sleeve to urge the sleeve into locking engagement with the cable.

9. A cable assembly including a flexible cable, a fitting having one end threaded and the other end provided with a tapered bore, a split tapered sleeve having interior circumferentially formed projections, engaging one end of the cable and received within the tapered bore, and means including a projection carried by the fitting adapted to be moved into contact with the enlarged end of the sleeve to fix the cable and fitting together.

10. An article of manufacture including a flexible cable, a fitting having an outwardly tapering bore in one end, a split tapered sleeve engaging one end of the cable received within the tapered bore, and means including an overturned projection integral with the fitting to engage the sleeve and fix the cable and fitting together.

EDWIN C. HEDLER.